(12) United States Patent
Konishi (10) Patent No.: US 7,329,966 B2
(45) Date of Patent: Feb. 12, 2008

(54) VEHICLE-MOUNTED ELECTRICAL GENERATOR CONTROL SYSTEM ENABLING SUPPRESSION OF SUPPLY VOLTAGE SPIKES THAT RESULT FROM DISCONNECTING ELECTRICAL LOADS

(75) Inventor: Toshiya Konishi, Chita-gun (JP)

(73) Assignee: Denso Corporation, Kariya (JP)

( * ) Notice: Subject to any disclaimer, the term of this patent is extended or adjusted under 35 U.S.C. 154(b) by 309 days.

(21) Appl. No.: 11/147,239

(22) Filed: Jun. 8, 2005

(65) Prior Publication Data

US 2005/0269880 A1 Dec. 8, 2005

(30) Foreign Application Priority Data

Jun. 8, 2004 (JP) ............... 2004-169702

(51) Int. Cl.
*H02G 3/00* (2006.01)
*H02H 7/06* (2006.01)
(52) U.S. Cl. ...................... 307/10.1; 361/20
(58) Field of Classification Search ............... 307/10.1, 307/9.1, 32; 361/20
See application file for complete search history.

(56) References Cited

U.S. PATENT DOCUMENTS 5,262,711 A 11/1993 Mori et al.
5,645,745 A * 7/1997 Hartwick et al. ........... 219/497
6,426,569 B1 * 7/2002 Ichikawa et al. .......... 307/10.1

FOREIGN PATENT DOCUMENTS

JP A 4-12639 1/1992
JP A 9-14029 1/1997

* cited by examiner

*Primary Examiner*—Robert L. Deberadinis
*Assistant Examiner*—Michael Rutland-Wallis
(74) *Attorney, Agent, or Firm*—Oliff & Berridge, PLC (57) ABSTRACT

A vehicle generator control system detects a time point at which an electrical load is to be disconnected from the generator output, with the detection being achieved prior to that disconnection time point, and initiates a lowering of the generated current of the generator by an amount equal to the load current of that electrical load. The generated current of the generator is thereby reduced, by the time of the disconnection, to a value whereby substantially no voltage spike is produced in the generator output voltage.

7 Claims, 7 Drawing Sheets

FIG. 5 ial load. The level of output voltage of such an electrical
VEHICLE-MOUNTED ELECTRICAL GENERATOR CONTROL SYSTEM ENABLING SUPPRESSION OF SUPPLY VOLTAGE SPIKES THAT RESULT FROM DISCONNECTING ELECTRICAL LOADS This application is based on and incorporates herein by reference Japanese Patent Application No. 2004-169702 filed on Jun. 8, 2004.

BACKGROUND OF THE INVENTION

1. Field of Application

The present invention relates to a control system of an electrical generator of a vehicle, and in particular to an electrical generator control system whereby the production of voltage spikes in a supply voltage, resulting from disconnection of an electrical load, can be substantially suppressed.

2. Description of Prior Art

A motor vehicle is equipped with an electrical generator which is in general constituted as an alternator (e.g., 3-phase AC generator) that is driven by the vehicle engine, in combination with a rectifier circuit, to produce an unsmoothed DC output voltage. The electrical generator serves not only for charging the storage battery of the vehicle (referred to in the following simply as the battery) but also for supplying power to various types of electrical load. The level of output voltage of such an electrical generator, and hence the total value of output current that is supplied to the battery and the loads, is controlled through adjustment of the level of field current of the alternator, by varying the duty ratio of successive on/off switching of the field current. This control of the generator voltage is performed by a circuit generally referred to as the regulator.

Japanese patent publication No. 4-12639 describes such a prior art type of electrical generator control system, whereby when one of various electrical loads of that are supplied from the output of the electrical generator is disconnected, the magnitude of a resultant increase in the output voltage of the electrical generator is detected, and control is applied to lower that output voltage of and thereby reduce the level of generated current (by reducing the field current of the alternator) in accordance with the detected amount of voltage increase.

With such a prior art generator control method, a certain amount of delay will occur between the time point at which the electrical load is removed and the point at which control of generator output (reduction of the generated current level) becomes fully effective. Hence, a voltage spike that is of significant amplitude may occur at the time of load disconnection.

Figure 4:
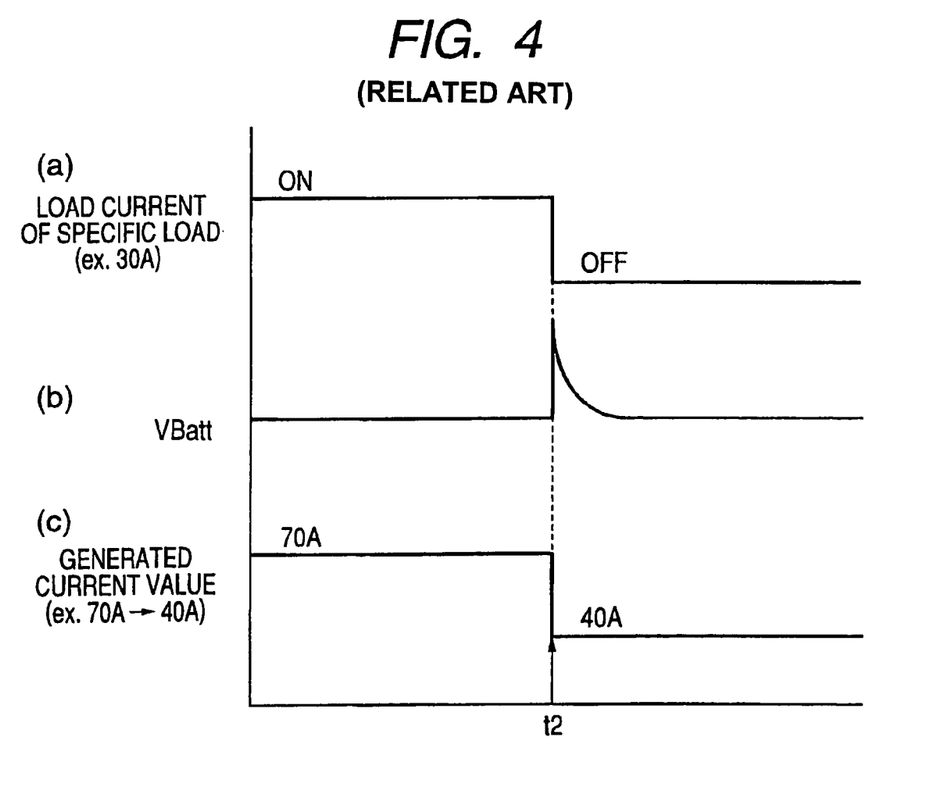
FIG. 4 is a timing diagram for describing a disadvantage of a prior art type of vehicle generator control system.

This is illustrated in FIG. 4, in which it is assumed that the level of current supplied by the electrical generator is reduced from 70 A to 40, when disconnection of a certain electrical load occurs at the time point t2. As shown, a voltage spike appears in the battery voltage (i.e., the output voltage of the electrical generator), and such voltage transients can have serious adverse effects upon the operation of various equipment of the vehicle, such as an ECU that performs overall control of the vehicle, equipment that controls the power steering system of the vehicle, etc.

In particular, if the level of current being supplied to the electrical load prior to its disconnection is high, and/or the battery is fully charged, or almost fully charged, then such a voltage spike will be large in amplitude.

SUMMARY OF THE INVENTION

It is an objective of the present invention to overcome the above disadvantages of the prior art, by providing a vehicle generator control system whereby (for each of one or more specific electrical loads) occurrence of a voltage spike in the generator output voltage, when a specific electrical load is disconnected from the electrical generator output, is prevented, or the amplitude of such a voltage spike is substantially reduced, by ensuring that at the time point of disconnection of that specific electrical load, the output current of the electrical generator has been reduced by an appropriate amount.

To achieve this, a time point at which the specific electrical load is to be disconnected is detected at a time point that precedes the disconnection time point, and the operation of the electrical generator is controlled such that the generated output current is reduced by an amount equal to the level of current that is being supplied to the specific electrical load, with an operation to effect that reduction of the generated current being commenced at the detection time point.

More specifically, according to a first aspect, the invention provides a vehicle generator control-system for controlling a vehicle-mounted electrical generator that is driven by the vehicle engine, the electrical generator and a storage battery being coupled in common to supply power to a plurality of electrical loads. The vehicle generator control system include voltage regulator means for controlling the electrical generator to supply a target value of generated voltage, and generator control means for calculating a target value of output voltage of the electrical generator, with that voltage value corresponding to a target value of generated current. The target value of output current is based upon factors that include the status (i.e. state of charge, level of charging current) of the storage battery, the status of the electrical loads, etc. The generator control means transmits target command information to the voltage regulator means, which indicates the target value of generated voltage.

A vehicle generator control system according to the present invention is characterized in that the generator control means (which would be typically be implemented by functions of an ECU of the vehicle, such as an engine control ECU) comprises:

(a) load disconnection timing detection means for detecting a disconnection time point, at which a specific electrical load is to be disconnected from the output of the electrical generator, with the detection achieved before that disconnection is actually executed, and with the detection being performed based on condition information relating to the specific electrical load, (b) generated output calculation means for calculating the specific load current value that is being supplied to the specific electrical load, based on the level of electrical power that is being consumed by that electrical load prior to the disconnection, and (c) generated output control command means responsive to information from the load disconnection timing detection means and the generated output calculation means for transmitting target command information to the voltage regulator means, prior to the time of disconnection, for initiation a lowering of the generated current output of the generator by an amount equal to the specific load current value.

In that way, it can be ensured that for example referring to the prior art timing chart example of FIG. 4, the electrical generator output current will already have been reduced from 70 A to 40 A by the time that the disconnection time point t2 is reached. Hence, no abrupt change in that output current will occur at time point t2, so that the voltage spike can be suppressed or substantially reduced in amplitude.

If for example the duration for which the specific electrical load is connected to the output of the electrical generator is determined by a timer, then it can be arranged that the timer will attain a specific elapsed time value at a point (referred to in the following as a pre-disconnection time point) which precedes the disconnection time point of that electrical load by a predetermined interval. In that case, the elapsed time of the timer can be monitored to detect the pre-disconnection time point.

The target command information for resulting in a lowering of the generating current is transmitted to the voltage regulator means when that pre-disconnection time point is detected. Actual disconnection of the load thus occurs after the (short) predetermined interval has elapsed following the transmitting of the target command information.

Alternatively, if the connection and disconnection of the specific electrical load to/from the output of the electrical generator is controlled based on a condition of a sensor signal, then the pre-disconnection time point may be detected based on that sensor signal. For example, the system may operate such as to detect, as a pre-disconnection time point, the point at which a temperature sensor signal exceeds a predetermined threshold value, with the specific electrical load to be disconnected from the generator output following a predetermined time interval after the threshold value is exceeded.

As a further alternative, successive values of the sensor signal could be monitored, to predict (e.g., based on the magnitudes and the rate and direction of change of successive values) a time point (i.e., as a pre-disconnection time point) that precedes the time point at which a predetermined threshold value will be exceeded, with the specific electrical load being disconnected from the generator output when the threshold value is exceeded.

The specific electrical load might for example be the compressor of a vehicle air conditioner apparatus, with the sensor values representing vehicle interior temperature values.

Such an electrical generator control system according to the present invention may further be configured such that the generator control means calculates, prior to actual disconnection of a specific electrical load, an optimum value of generated current to be produced by the electrical generator subsequent to that load disconnection. The optimum value is calculated based on the value of load current that is currently being supplied to the specific electrical load and on at least one of a plurality of vehicle-related conditions that include the level of current being supplied by the electrical generator at the time when the optimum value of generated current is calculated, the state of charge of the battery at that time, the speed of rotation of the vehicle engine at that time, the temperature of the engine coolant, etc.

In that case, the generator control means supplies target command information that indicates the optimum value of generated current to the voltage regulator means (i.e., command information which will cause the voltage regulator means to apply control whereby a generated output voltage corresponding to that optimum value of generated current) prior to the load disconnection time point.

Such an electrical generator control system may further be configured such that the generator control means selectively supplies to the voltage regulator means the target command information designating a reduced value of the generated output current, in accordance with the state of charge of the storage battery. Specifically, if the battery is in a low state of charge, then when an electrical load is removed from the electrical generator output, the current that previously flowed into that load will flow into the battery as an increased amount of charging current. Hence, the reduction of the generated output current is not implemented, since in that case no appreciable amplitude of voltage spike will be produced.

DESCRIPTION OF PREFERRED EMBODIMENTS

First Embodiment

Figure 1:
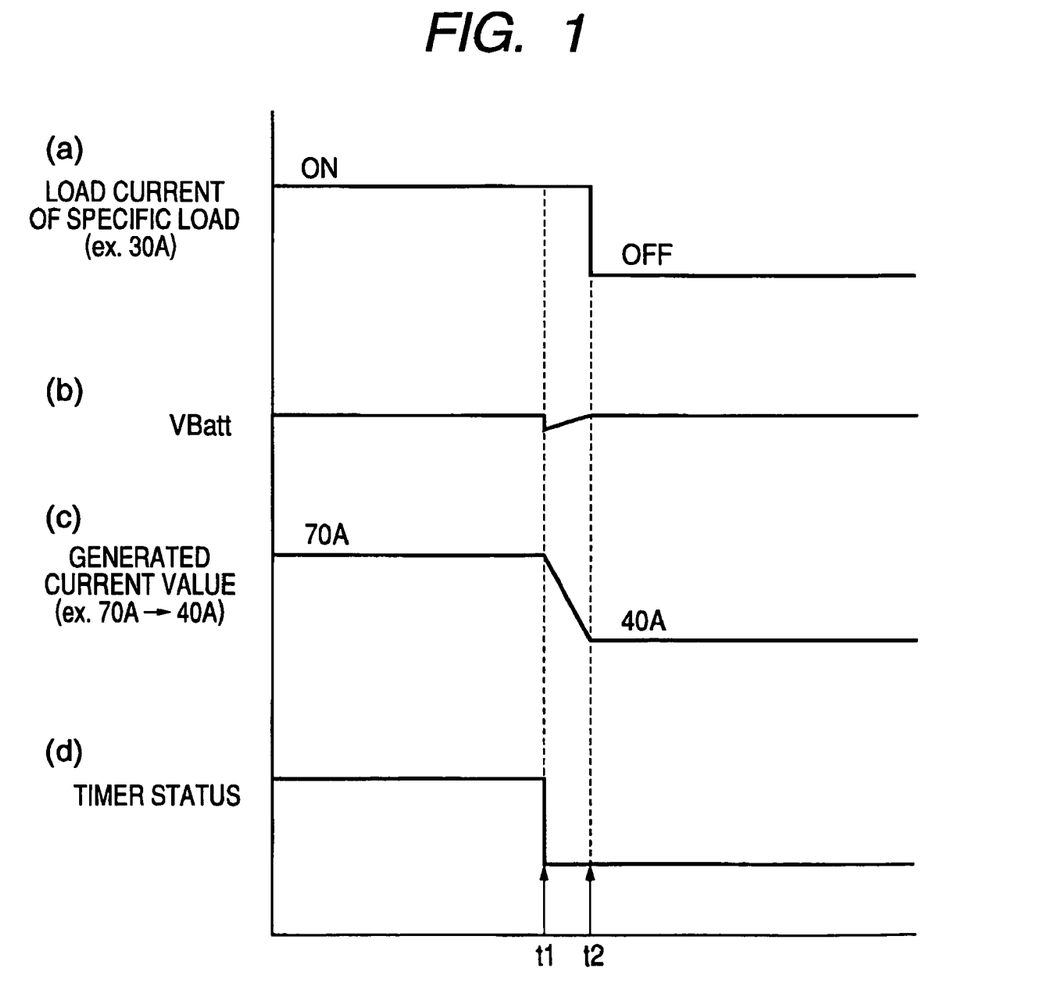
FIG. 1 is a timing diagram for describing the operation of a first embodiment of a vehicle generator control system.
Figure 2:
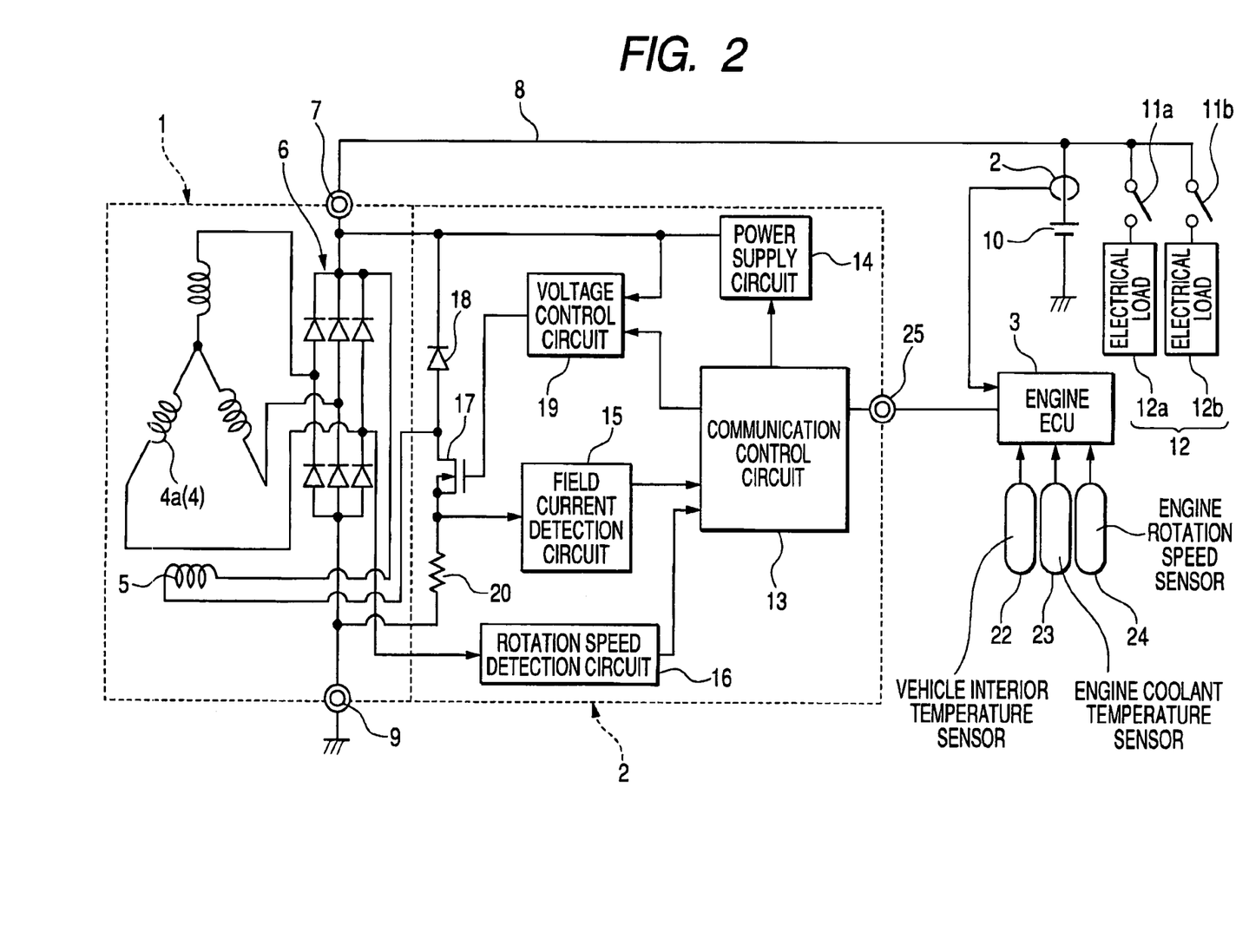
FIG. 2 is a general system diagram of a vehicle electrical system incorporating the embodiment.

FIG. 1 is a timing diagram for use in describing the operation of a first embodiment of a vehicle generator control system. FIG. 2 is a general system block diagram of this embodiment, which is constituted as a combination of a regulator 2 and an engine ECU 3. The regulator 2 controls the output voltage of an electrical generator 1 (referred to in the following simply as the generator 1) formed of a 3-phase alternator having Y-configuration phase windings 4 and a field winding 5 that is driven for rotation by the vehicle engine (not shown in the drawings) to produce a rotating magnetic field, and a full-wave rectifier 6 which rectifies the 3-phase output voltages of the phase windings 4, to supply a positive DC output voltage supplied via a B terminal 7 to a power supply lead 8. The negative-voltage side of the rectifier circuit 6 is connected via an E terminal 9 to the vehicle ground potential.

The AC voltage of a phase winding 4a is detected for use in detecting the speed of rotation of the rotor of the generator 1. The engine ECU 3 (among other functions) acts through the regulator 2 to control the power generation operation of the generator 1.

In addition to being connected to a battery 10, the power supply line 8 can also be connected via respective switches 11a, 11b to electrical loads 12a, 12b, collectively indicated as a load 12.

During engine rotation, the regulator 2 serves to control the output voltage of the generator 1 to a regulated voltage value Vr. The regulator 2 includes a communication control circuit 13, a power supply circuit 14, a field current detection circuit 15, a rotation speed detection circuit 16, a voltage control circuit 19, a switching FET 17, a reverse current bypass diode 18 and a current sensing resistor 20. Regulation of the output voltage of the generator 1 is performed by successively interrupting a flow of field current through the field winding 5, by the switching FET 17, under the control of the voltage control circuit 19. The reverse current bypass diode 18, connected between the drain of the B terminal 7 and the B terminal, serves to pass a reverse current flow from the field winding 5, which occurs when the field current is interrupted by the switching FET 17 being switched to an open-circuit state between it drain and source electrodes.

The voltage control circuit 19 supplies a duty ratio control signal to the gate electrode of the switching FET 17, to control the duty ratio of the ON/OFF switching performed by the switching FET 17. That duty ratio is determined by the voltage control circuit 19 based on the difference between the output voltage of the generator 1 and the regulated voltage value Vr.

The communication control circuit 13 is connected for serial data communication with the engine ECU 3 via a communication network that is constituted as a vehicle LAN (local area network). The communication control circuit 13 transmits various information to the engine ECU 3, including the level of field current flowing in the field winding 5 and the speed of rotation of the rotor of the etc. The communication network preferably utilizes a "single-wire" type of configuration, based on the well-known CAN (Control Area Network) or LIN (Local Interconnection Network) communication protocol, for example.

The power supply circuit 14 supplies DC power for operating the circuits of the regulator 2. The field current detection circuit 15 detects the level of field current flowing in the field winding 5 as a voltage developed across the sensing resistor 20, which is connected between the source electrode of the switching FET 17 and the ground potential, and supplies information specifying that value of field current to the communication control circuit 13, to be transferred to the engine ECU 3. The rotation speed detection circuit 16 detects the frequency of the phase voltage of the phase winding 4a, to thereby detect the speed of rotation of the rotor of the generator 1, and supplies that speed information to the communication control circuit 13, to be transferred to the engine ECU 3.

In addition, information from various sensors is inputted to the engine ECU 3, including information from a current sensor 10 which detects the level of charging current flowing into the battery 10. The engine ECU 3 also measures the voltage level of the battery 10 during charging, and uses the charging current information and voltage level information to detect the state of charge of the battery 10. The sensors also include a sensor 22 that detects the interior (i.e., passenger compartment) temperature of the vehicle, an engine coolant temperature sensor 23, and a sensor 24 that detects the speed of rotation of the vehicle engine.

Based on these various types of information, the engine ECU 3 obtains the value of current that is currently being supplied by the generator 1, and acts through the regulator 2 to control the generator 1 to generate an appropriate level of output voltage that corresponds to an appropriate level of output current under the operating conditions of the vehicle at that time.

An example of the electrical generator control operation of the engine ECU 3 will be described in the following. When an engine starter switch (not shown in the drawings) is actuated, the engine ECU 3 transmits an operation start signal to the communication terminal 25 of the regulator 2 and hence to the communication control circuit 13. When the communication control circuit 13 confirms that this operation start signal has been received, then firstly a "power supply switch-on" signal is supplied from the communication control circuit 13 to the power supply circuit 14, which then begins to supply operating power to various circuits of the regulator 2, whose operation thus begins. Thereafter, the regulated voltage value Vr is transmitted from the engine ECU 3 to the communication control circuit 13, and thereby supplied to the voltage control circuit 19.

When firing of the vehicle engine has started, and the engine rotation speed reaches a certain value, then if no electrical load 12 is being supplied (or only a low level of electrical load), and only a low level of discharge current is being supplied as load current from the battery 10, the output voltage of the generator 1 will begin to rise above the output voltage of the battery 10. Thereafter, the generator 1 is controlled by the voltage control circuit 19 to limit the output voltage of the generator 1 to the regulated voltage value Voltage regulator, by generating a duty ratio control signal in accordance with the difference between the regulated voltage value Vr and the actual output voltage of the generator 1, with the duty ratio control signal being applied to control the switching FET 17. ON/OFF switching of the switching FET 17 is thereby performed in accordance with the duty ratio control signal, to periodically interrupt the field current of the field winding 5, and thereby bring the output voltage of the generator 1 towards the regulated voltage value Vr.

It will be assumed that the electrical load 12a is a specific load whereby a time point for disconnection of that load from the output of the generator 1 can be detected by the engine ECU 3 before the disconnection is actually performed. In particular, it will be assumed that the operation of a timer (whose elapsed time values are monitored by the engine ECU 3, and which may or may not be implemented as a function of the engine ECU 3) is started when the electrical load 12a is connected to the output of the generator 1 (that is, when the corresponding switch 11a is closed) and that a specific elapsed time interval of the timer (e.g., corresponding to the pre-disconnection time point t1 in FIG. 1) is predetermined to occur at a fixed interval prior to each disconnection time point of the electrical load 12a.

When the engine ECU 3 finds that a pre-disconnection time point of the specific electrical load 12a has been reached, then a special mode of controlling the output power of the generator 1 is established, referred to in the following as the generated output restraining mode. To achieve this, the engine ECU 3 implements an electrical load disconnection time point detection function, a load current calculation function, and a generated output restraint command function. Specifically:

the electrical load disconnection time point detection function serves to detect when a pre-disconnection time point is reached, based on status information relating to the specific electrical load;

the load current calculation function serves to calculate the load current consumed by the specific electrical load, based on the amount of electrical power being consumed by that load prior to be disconnected from the electrical generator output; and the generated output restraint command function uses the information obtained by the load current calculation function to calculate a reduced value of electrical generator output current (i.e., reduced by an amount equal to the load current of the specific electrical load) and to transmit to the regulator 2, at the pre-disconnection time point, a command for reducing the generated output current accordingly.

There can of course be a plurality of specific electrical loads whose disconnection time points can be detected, each controlled as described herein for the specific electrical load 12a, such as the compressor of the vehicle air conditioner apparatus, the vehicle headlamps, etc.

As an alternative to control based on a timer, disconnection of such an electrical load from the output of the electrical generator 1 may be controlled based on a value of a sensor signal that detects a parameter such as temperature, e.g., with that electrical load being disconnected from the electrical generator output when the sensor signal level exceeds a predetermined threshold value. In that case the engine ECU 3 can monitor successive values of the sensor signal and thereby detect (based on the signal level and its direction and rate of change) a pre-disconnection time point such as the time point t1 of FIG. 1.

The operations whereby a reduction of the generated current is initiated when a pre-disconnection time point is detected will be collectively referred to as the "generated output restraint mode", and the processing executed by the engine ECU 3 in this mode will be described in the following. It will be understood that the operations described are applied in a condition in which the speed of rotation of the vehicle engine is sufficient that the generator 1 is supplying the load currents of the various electrical loads.

It will again be assumed that a timer is set in operation when the electrical load 12a becomes connected to the output of the electrical generator 1. A processing sequence that is periodically executed by the engine ECU 3 of the first embodiment in that case is illustrated in the flow diagram of FIG. 5.

Figure 5:
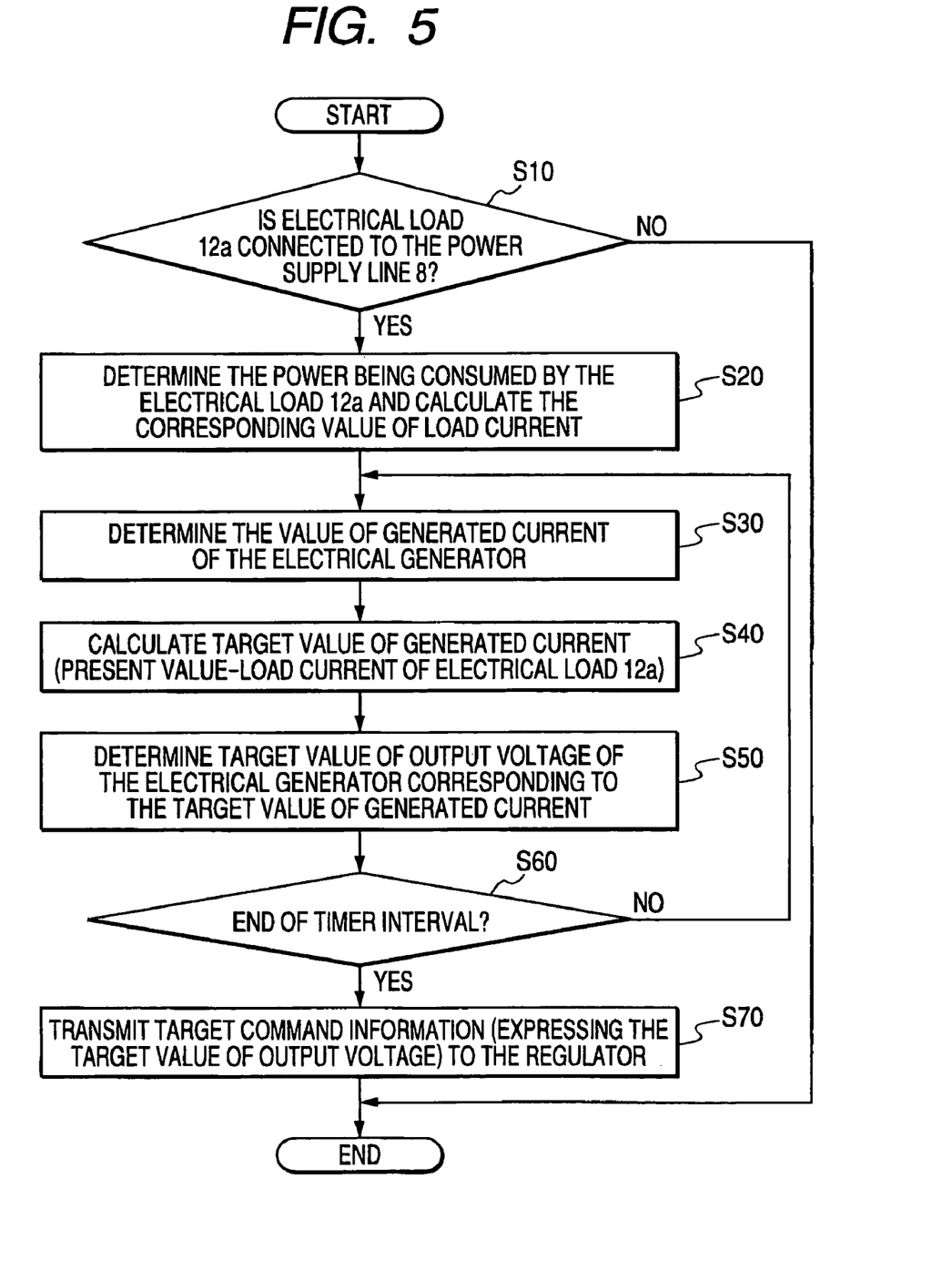
FIG. 5 is a flow diagram of an example of processing executed with the first embodiment.

Firstly (step S10), a decision is made as to whether the specific electrical load 12a is currently connected to the output of the generator 1. If the electrical load 12a is not connected, then this processing is terminated.

If the electrical load 12a is found to be connected, then based on the level of electrical power being consumed by the specific electrical load 12a (acquired in step S20) the corresponding load current is calculated (step S30), i.e., the part of the total output current of the generator 1 that is being drawn by the specific electrical load 12a.

A target value of generated output current from the generator 1 is then calculated (step S40), by subtracting the value of load current of the specific electrical load 12a from the value of generated output current of the generator 1 at that point in time. A target command, specifying a regulated voltage value for the generator 1 that corresponds to the target value of generated output current, is then prepared (step S50).

If it is then found (in step S60) from the elapsed time value of the timer that the pre-disconnection time point has been reached, the target command is transmitted to the regulator 2 (step S70).

In response to that command, the regulator 2 reduces the field current of the field winding 5 accordingly, to begin to lower the output voltage of the generator 1 to a level whereby the generated current of the generator 1 is brought towards the target value of generated output current (in the example of FIG. 1, from 70 A to 40 A). The duration of the aforementioned predetermined time interval between the pre-disconnection time point and the disconnection time point is set such that the reduction of the generated output current to the target level is completed by the time that the disconnection time point (t2) is reached.

As a result, occurrence of a voltage spike at the disconnection time point is effectively suppressed, or the amplitude of the voltage spike is substantially reduced.

In the above description it is assumed that the engine ECU 3 is connected to the regulator 2 for data communication via a vehicle LAN, however it would of course be equally possible to use any of various other arrangements for data (i.e., digital data) communication between these. In addition, the invention would be applicable to a system in which communication between the regulator 2 and engine ECU 3 is performed by analog signals.

Second Embodiment

With the first embodiment, during operation in the generated output restraint mode described above, a target value of generated output current from the generator 1 is calculated by subtracting the load current of the specific electrical load 12a from the value of output current that is being generated by the generator 1 at the pre-disconnection time point. That is to say, it is assumed not only that the same respective levels of load current will continue to be supplied to each of the electrical loads other than the load 12a, after the disconnection of load 12a, but also that substantially the same level of charge current is to be drawn by the battery 10. However it is possible that for example prior to disconnection of the specific electrical load, the battery 10 is at a low state of charge, but that the maximum level of output of the generator 1 at that time is insufficient to supply all of the electrical loads while also supplying a sufficient level of charging current to the battery 10. After disconnection of the specific electrical load however, a greater amount (i.e., up to 30 A in the example of FIG. 1) is available to be supplied as charging current to the battery 10. With a second embodiment therefore, the target value of generated current of the generator 1 that is to be established after disconnection of an electrical load is calculated such as to not only suppress occurrence of a voltage spike at the disconnection time point, but also such as to be optimized with respect to the overall operating condition of the vehicle engine and associated equipment, e.g., optimized with respect to charging the battery 10 and supplying each of the electrical loads, while taking into account such factors as the engine speed of rotation at that time, the engine coolant temperature, etc.

Hence with the second embodiment the target command that is transmitted from the engine ECU 3 to the regulator 2, prior to disconnection of a load such as the specific electrical load 12a, expresses such an optimized target value of generated output current of the generator 1 (more specifically, expresses a target value of output voltage of the generator 1, whereby that optimized target value of generated current will be attained).

This can be expressed as the following equation:

$$I_{tar} = I_{cur} - I_{load} \pm I_{adj} \qquad (1)$$

Where $I_{tar}$ is the target generated current value, $I_{cur}$ is the value of generated current of the generator 1 prior to the disconnection, $I_{load}$ is the load current of the specific electrical load that will be disconnected, and $I_{adj}$ is an amount by which the generated current level (after the disconnection) is to be adjusted to achieve optimized operation.

Thus for example assuming that the value of generated current $I_{cur}$ is 100 A, the load current $I_{load}$ of the specific electrical load is 40 A, and the battery 10 is in a very low state of charge and so requires a charging current level of 20 A, then from equation (1), the target generated current value is obtained as:

$$100\ A - 40\ A + 20\ A = 80\ A$$

In that way, the generator 1 can be controlled to operate at an output level that is optimized as far as possible, consistent with supplying sufficient load current to each of the electrical loads and also eliminating or substantially suppressing voltage spikes that result from load switch-off.

Figure 6:
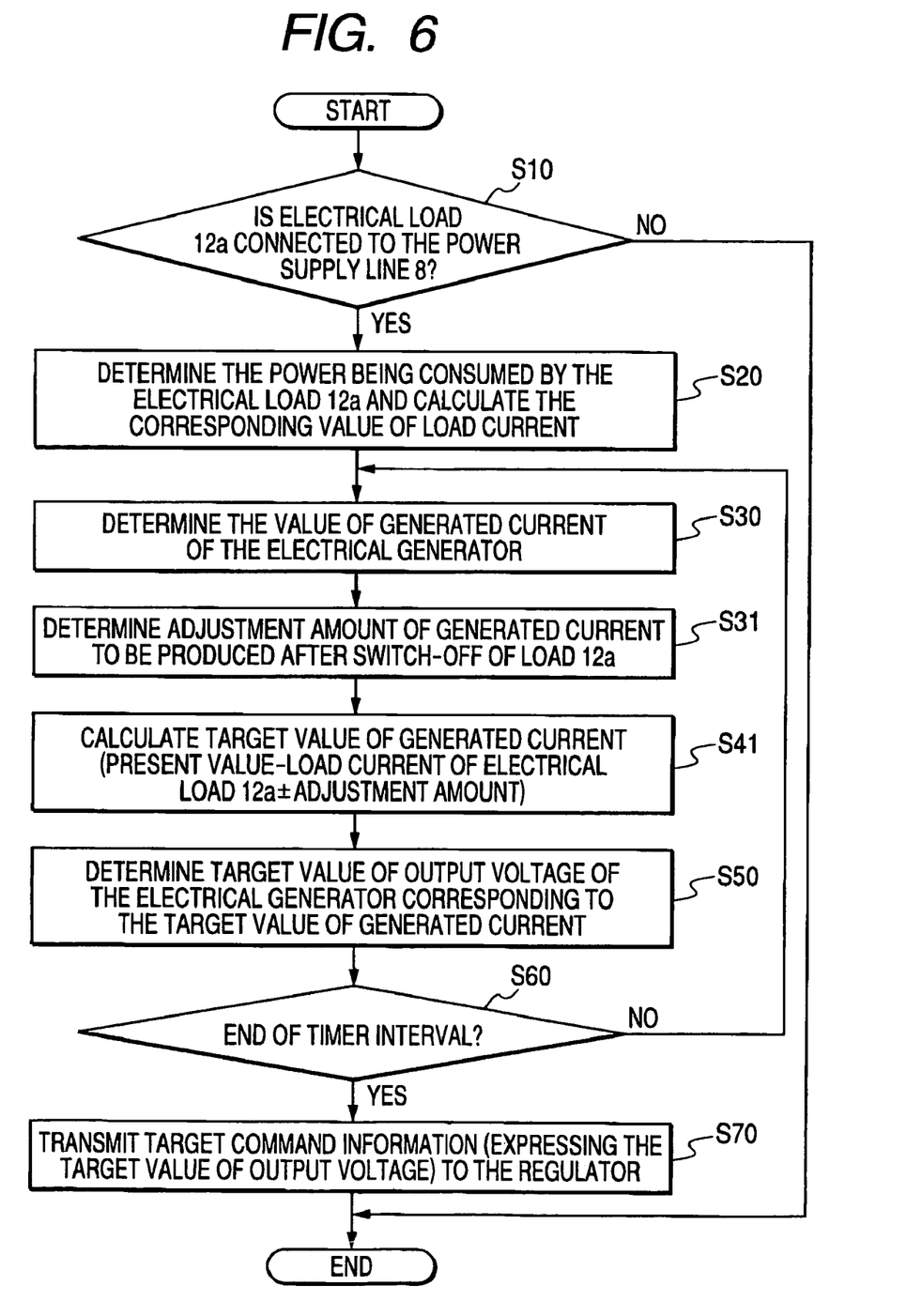
FIG. 6 is a flow diagram of an example of processing executed with the second embodiment.

A processing flow executed by the engine ECU 3 with the second embodiment, corresponding to the flow diagram of FIG. 5, is shown in FIG. 6. This differs from the flow diagram of FIG. 5 in that the aforementioned adjustment amount of generated current is determined in step S31, and used in calculating the target value of generated current, in step S41.

Third Embodiment

In the prior art, when the battery 10 is fully charged or is close to the fully charged condition, then disconnection of an electrical load from the generating output voltage will result in a substantial voltage spike as described above referring to FIG. 4. This is due to the fact that when the battery 10 is close to being fully charged, with the output voltage of the generator 1 being higher than the internal voltage of the battery 10, any increase in the output voltage of the generator 1 will not result in a significant increase in charging current that is drawn by the battery 10. However if the battery 10 is in a low state of charge, then an increase in the output voltage of the generator 1 will cause a significant increase in the level of charging current. Hence, if an electrical load is disconnected from the output voltage of the generator 1 when the battery 10 is in a low state of charge, although the level of that output voltage will tend to immediately increase, this will result in a large increase in current flow into the battery 10, thereby substantially suppressing the occurrence of a voltage spike at that time.

Figure 3:
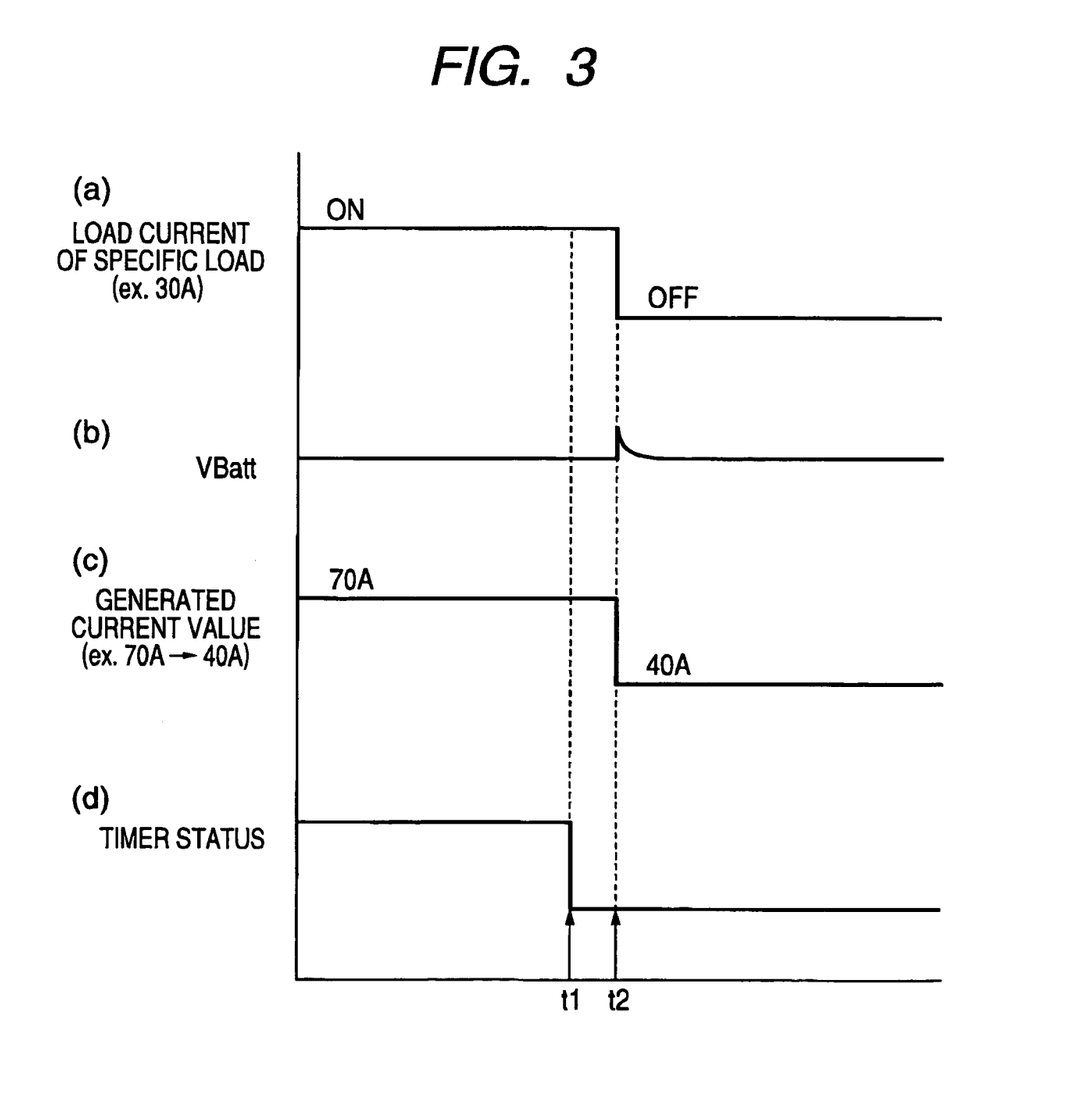
FIG. 3 is a timing diagram for describing the operation of a second embodiment.

A third embodiment of the invention utilizes that fact as follows. With the third embodiment, the generated output restraint mode described hereinabove for the first embodiment is selectively established in accordance with the state of charge of the battery 10. Specifically, if the state of charge of the battery 10 is below a predetermined threshold level, then no target command information for effecting a reduction of the generated output of the generator 1 is transmitted by the engine ECU 3 to the regulator 2 when it is detected that disconnection of a specific electrical load is to be performed. This is illustrated in the timing diagram of FIG. 3, with only a small amplitude of voltage spike being produced at time point t2 when the specific electrical load is disconnected by the engine ECU 3.

If the state of charge of the battery 10 is above the threshold level, then the operation of this embodiment is identical to that of the first embodiment.

Figure 7:
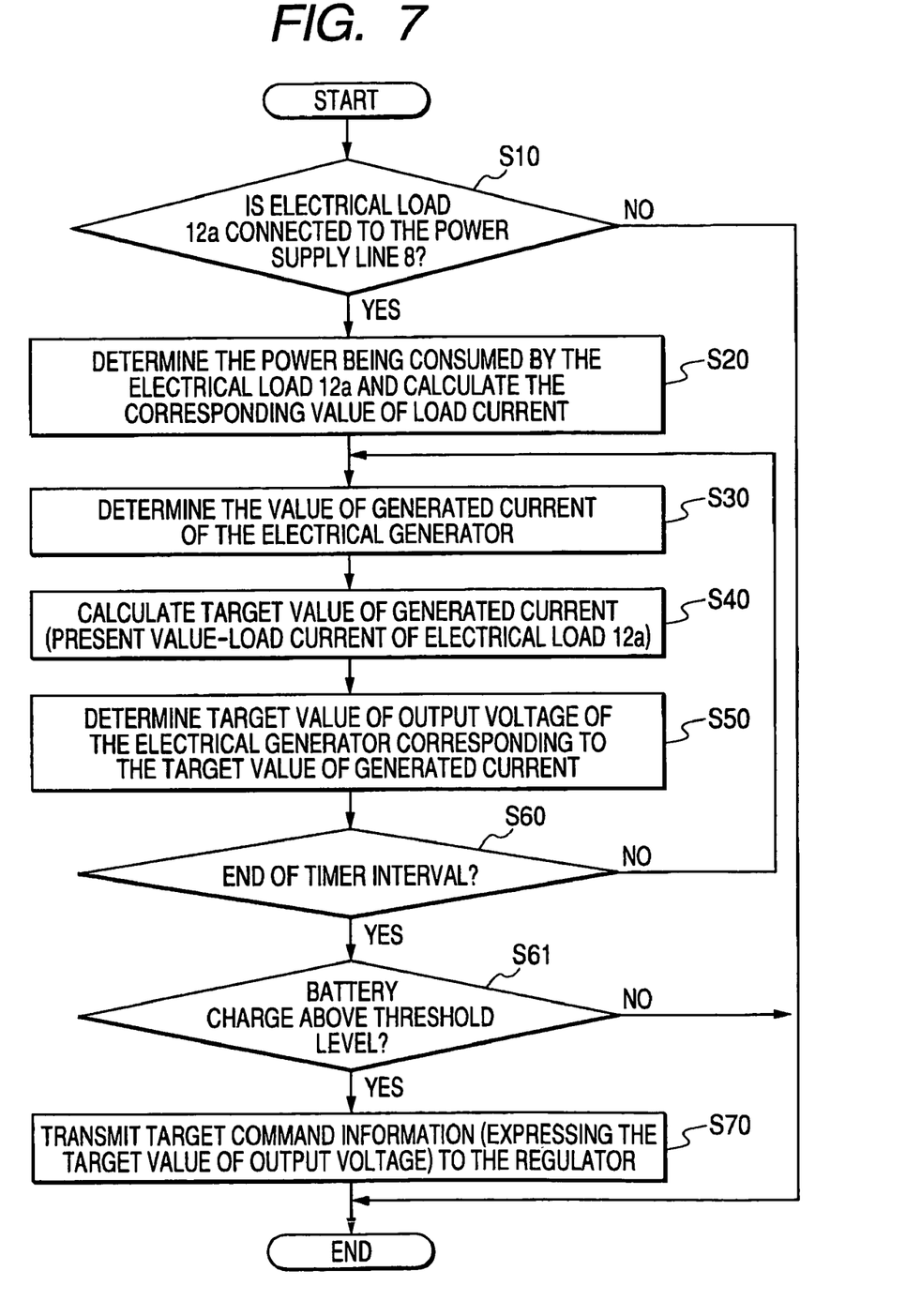
FIG. 7 is a flow diagram of an example of processing executed with the third embodiment.

A processing flow executed by the engine ECU 3 with the third embodiment, is shown in FIG. 7. This differs from the flow diagram of FIG. 5 in that when it is judged in step S60 that a pre-disconnection time point has been reached, a decision is made (step S61) as to whether the level of charge of the battery 10 is above a predetermined threshold level. If the level of charge is above the threshold, then steps S70 to S90 are executed as for the flow diagram of FIG. 5, while otherwise, the processing sequence is ended.

It should be noted that the invention is not limited to the embodiments described above, and that various modifications to these could be envisaged which fall within the scope claimed in the appended claims.

What is claimed is:

1. A vehicle-mounted electrical generator control system for controlling an electrical generator that is driven by a vehicle engine, said electrical generator producing a generated current for supplying respective load currents to a plurality of electrical loads and a charging current of a battery of said vehicle, said system including:

voltage regulator means for controlling said electrical generator to produce a regulated output voltage, and generator control means for deriving a currently obtained value of said generated current and for calculating a target value of said generated current and for sending target command information indicative of said target value to said voltage regulator means, said target value being determined based upon factors including a condition of said storage battery and a utilization status of said electrical load(s);

wherein said generator control means comprises:

load disconnection timing detection means for detecting a disconnection time point, at which a specific one of said plurality of electrical loads is to be disconnected from said electrical generator while continuing to supply said respective load currents to remaining ones of said plurality of electrical loads and continuing to supply said charging current, with said disconnection time point being detected at a pre-disconnection time point prior to said load disconnection time point, based on condition information relating to said specific electrical load, generated output calculation means for calculating, as a specific load current value, a value of current that is being supplied to said specific one of said plurality of electrical loads, based on a value of electrical power that is being consumed by said specific one of said plurality of electrical loads prior to said disconnection, and generated output control command means responsive to information from said load disconnection timing detection means and said generated output calculation means for transmitting to said voltage regulator means, prior to said disconnection time point, target command information specifying a value of said generated output current that is decreased from said currently obtained value thereof by an amount equal to said specific load current value.

2. A vehicle-mounted electrical generator control system according to claim 1, wherein said target command information is transmitted to said voltage regulator means at a time point substantially coincident with said pre-disconnection time point, and wherein a duration of a time interval between said pre-disconnection time point and said disconnection time point is predetermined as a specific fixed value.

3. A vehicle-mounted electrical generator control system according to claim 1, wherein said condition information relating to said specific one of said plurality of electrical loads is derived from a timer whose operation is started when said specific one of said plurality of electrical loads becomes connected to said output voltage of said electrical generator.

4. A vehicle-mounted electrical generator control system according to claim 1, wherein said specific condition information relating to said specific one of said plurality of electrical loads is derived from a sensor which detects parameter values relating to said specific one of said plurality of electrical loads.

5. A vehicle-mounted electrical generator control system according to claim 1, wherein:

said generator control means calculates an optimum value of generated current to be produced by said electrical generator following disconnection of said specific one of said plurality of electrical loads, with said optimum value being calculated based on said value of load current that is being supplied to said specific one of said plurality of electrical loads and on at least one of a plurality of vehicle-related conditions that include a value of said generated current prior to disconnection of said specific one of said plurality of electrical loads, a state of charge of said battery, a speed of rotation of said vehicle engine, and a temperature of said engine; and said generator control means supplies target command information indicative of said optimum value of generated current to said voltage regulator means, prior to said disconnection of said specific one of said plurality of electrical loads.

6. A vehicle-mounted electrical generator control system according to claim 1, wherein said generator control means selectively supplies to said voltage regulator means said target command information designating a reduced value of said generated output current, in accordance with a state of charge of said storage battery.

7. A vehicle-mounted electrical generator control system according to claim 1, wherein said voltage regulator means and said generator control means are connected for communication via a data communication network in which multiplexed communication is executed via a single signal line.

* * * * *